Patented June 17, 1924.

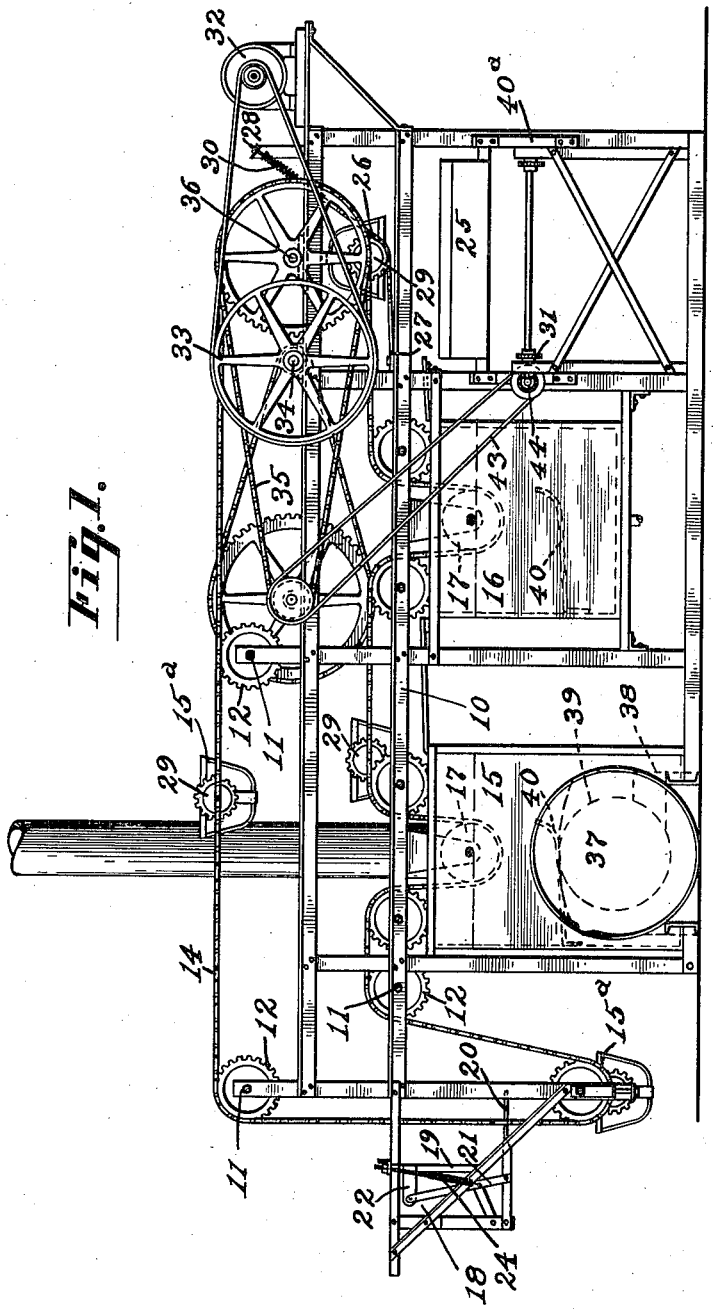

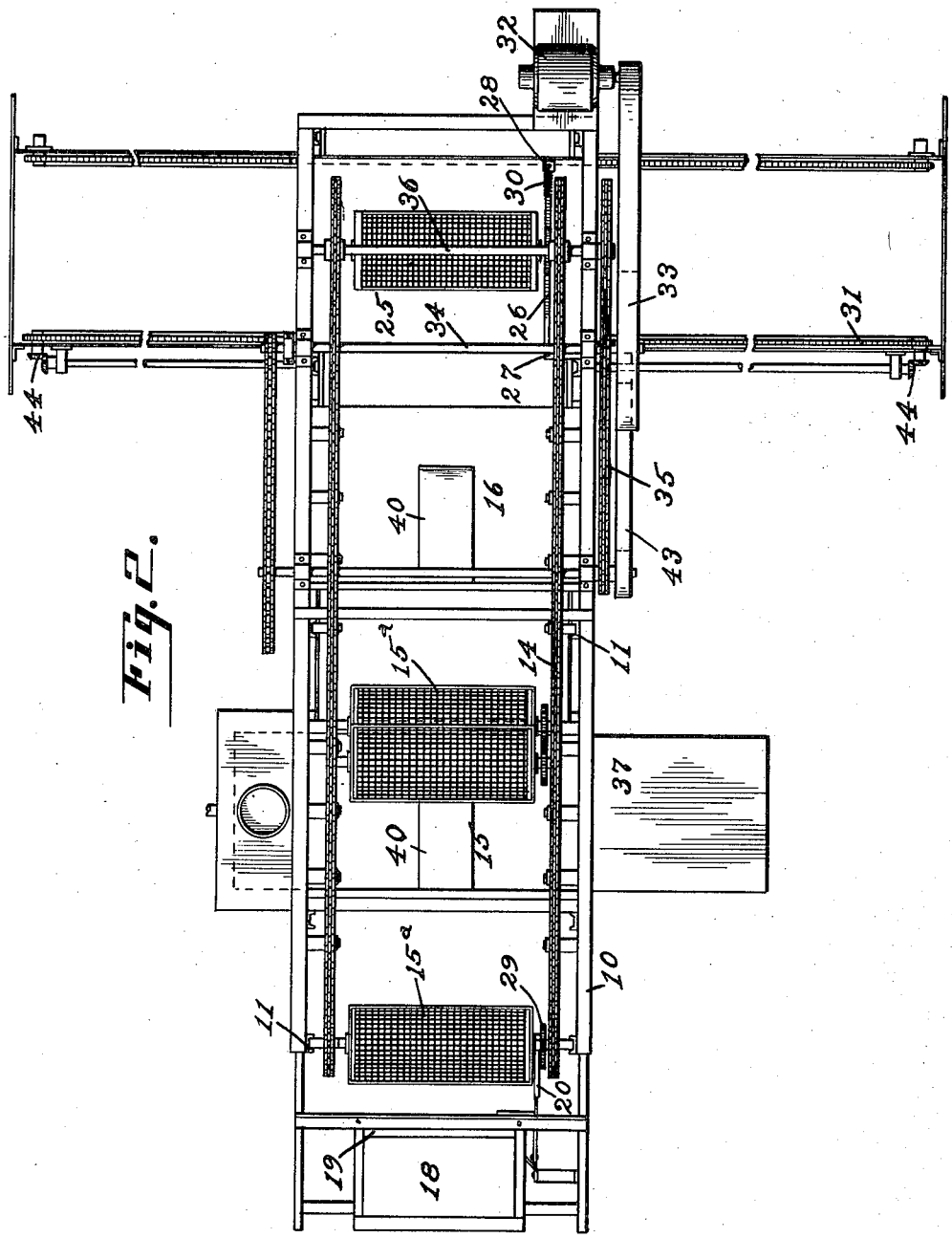

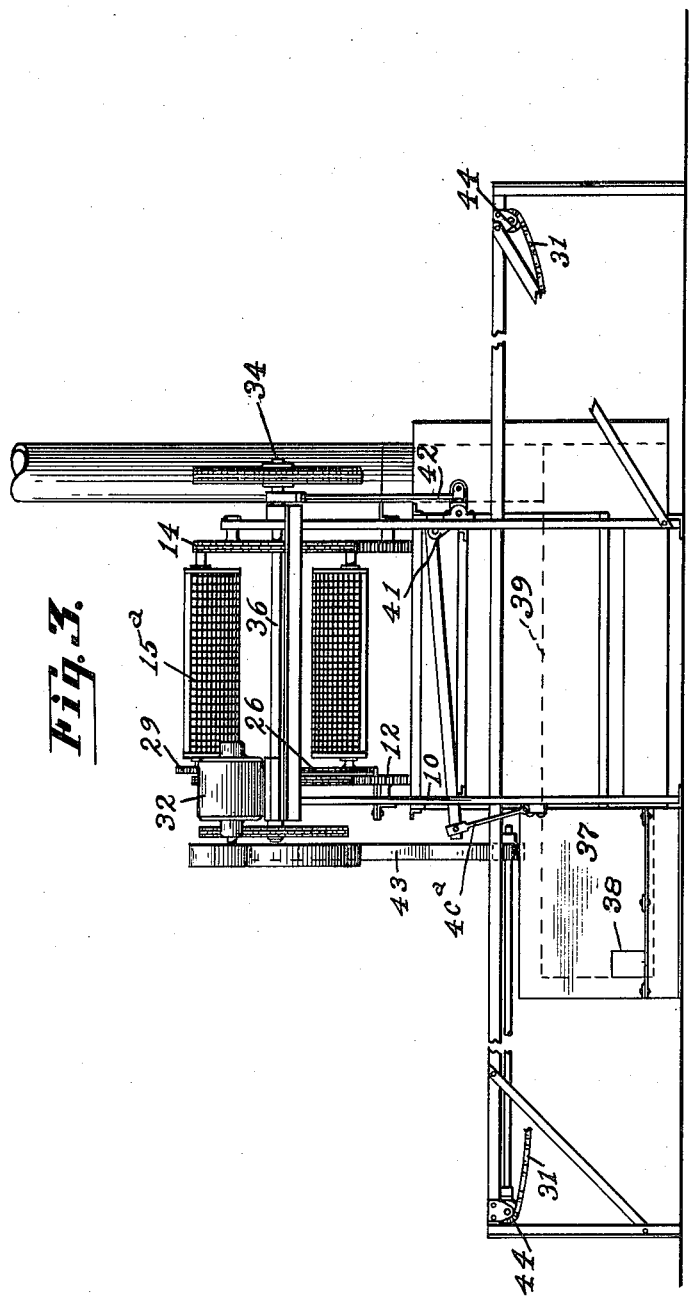

1,498,314

UNITED STATES PATENT OFFICE.

RUSSELL W. ASHLEY AND JAY A. ASHLEY, OF YUBA CITY, CALIFORNIA.

FRUIT-TREATING MACHINE.

Application filed October 22, 1923. Serial No. 670,128.

*To all whom it may concern:*

Be it known that we, RUSSELL W. ASHLEY and JAY A. ASHLEY, citizens of the United States, residing at Yuba City, county of Sutter, and State of California, have invented new and useful Improvements in Fruit-Treating Machines, of which the following is a specification.

This invention relates to machines for treating fruit prior to dehydrating the same.

In drying fruit, particularly prunes and grapes, it is necessary to subject the entire surface of the fruit to action of a heated lye solution which acts to check the skin of the fruit to facilitate the latter's dehydration. To prevent spoiling of a portion of the fruit during dehydration, in treating the fruit it is necessary that the checking solution be maintained at an even temperature and that all of the fruit be subjected to the action thereof for an equal time period. It is also necessary that the entire surface of the fruit be acted upon by the solution, otherwise the fruit becomes "spotted" and will decay after dehydration.

It is the principle object of the present invention to provide a machine for mechanically dipping fruit in a checking solution and then properly rinse the same, which machine embodies the use of an improved operating mechanism to which fruit may be delivered, which mechanism will automatically operate to thoroughly and evenly subject fruit delivered thereto to the action of a heated checking solution, and then rinse the fruit to remove the solution and thereafter automatically discharge the fruit from the machine upon trays conveyed through the machine.

In carrying out this invention, we provide a pair of tanks, one containing a checking solution, the other a rinsing medium. A continuously operating conveyor is provided. This device is fitted with fruit receiving baskets to which fruit is automatically delivered from a hopper. The conveyor is arranged so that the baskets are successively submerged in the checking solution and then in the rinsing water. Means are provided to automatically discharge the fruit from the baskets after the latter are removed from the rinsing tank. The fruit is discharged onto a reciprocating inclined draining screen which operates to evenly spread the fruit over trays which are continuously conveyed through the machine.

One form which the invention may assume is exemplified in the following description and illustrated by way of example in the accompanying drawings in which:

Fig. 1 is a side elevation of a machine embodying the preferred form of the invention.

Fig. 2 is a plan view of the same.

Fig. 3 is an elevation of the discharge end of the machine.

Referring more particularly to the accompanying drawings, 10 indicates a main frame fitted with journals 11 in which are mounted the shafts of pairs of sprocket wheels 12. These sprockets support a pair of endless chains 14 between which a plurality of foraminous baskets 15$^a$ are pivotally suspended at equally spaced intervals. The chains 14 constitute an endless conveyor which is adapted to continuously operate to convey the baskets through their cycle of operation.

Carried by the frame beneath the sprockets is a pair of tanks 15 and 16, the first of which is adapted to contain a solution for checking the skin of fruit. The second is a rinsing tank preferably containing clear water. The tanks are each fitted with bracket bearings supporting pairs of sprocket wheels 17 around which the conveyor chains are led. These sprockets are suspended within the tanks so that the baskets on the conveyor will be submerged in the liquid therein.

Mounted at the end of the frame is a feed hopper 18 into which the fruit to be dipped may be placed. This hopper is fitted with a swinging discharge gate 19 which is pivotally suspended from the top of the hopper. This gate is caused to automatically open to permit the discharge of the fruit from the hopper into the baskets as the latter successively pass the hopper. This is accomplished by the provision of a trip lever 20 which connects by a link 21 to an arm 22 on the swinging gate 19 of the hopper. The trip lever 20 extends to a position where it will be engaged and depressed by the shafts of the baskets as the latter are conveyed past the hopper. Engagement of the shafts of the baskets with the trip lever will cause the latter to open the hopper gate to permit the fruit in the hopper to be discharged into the baskets. When the shafts of the baskets move from engagement with the trip lever, the gate is automatically closed by a spring 24.

After the basket has been filled with fruit it is lowered into the tank 15 around the sprockets 17. From this tank it passes into the rinsing tank 16 wherein the basket is submerged to thoroughly wash the solution from the fruit. By the provision of the sprockets 17 in the tanks, we insure that the entire surface of the fruit will come into intimate contact with the solution as the baskets will be lowered into the tank, then moved longitudinally thereof to agitate the fruit so as to expose all of the surface of the fruit to the action of the checking and cleansing solutions.

The machine is fitted with means for automatically discharging the fruit from the baskets onto a reciprocable inclined shaker screen 25. This means comprises a stationary sprocket chain 26 which is anchored to the frame as at 27 and 28 and interposed in the path of travel of sprockets 29, one of which is fixed on the shaft of each basket at the end of the latter. When the sprockets 29 on the baskets engage the chain, the baskets are caused to revolve and are inverted and the fruit therein is thereby discharged onto the shaker screen 25. A tension spring 30 connects one end of the chain to the frame at 28 to maintain it taut. Mounted below the shaker screen 25 is an endless conveyor 31, the speed of which is such that fruit discharged from the shaker screen will be evenly spread upon trays carried by the conveyor.

For operating the continuous chains constituting the basket conveyor, an electric motor 32 is provided. The pulley of this motor is connected by a belt to a pulley 33 on a countershaft 34. This shaft is connected by a reduction set of sprockets and chains 35 to the shaft 36 upon which a pair of the conveyor chain driving sprockets 12 are mounted. These sprockets continuously drive the basket conveyor at a correct rate of speed.

It is preferred that the solution in the tank 15 be maintained heated at an even temperature. We accomplish this by providing a furnace 37 at one side of the tank 15, which furnace is fitted with an oil burner 38. The combustion chamber of the furnace extends transversely beneath the tank 15 and is fitted at the opposite side of the tank with a flue 39. By extending the combustion chamber through the tank 15 as shown in the drawings, we obtain a maximum heat radiating surface and are thereby enabled to maintain the solution at an even temperature. A furnace constructed as described results in a saving of fuel as well as keeping the solution at a proper temperature regardless of climatic variations and speed changes in the arrival of the fruit into the solution.

In operation of the machine, the motor 32 is started to drive the basket conveyor. Fruit is then emptied into the hopper and when the successive baskets pass the hopper, their shafts will engage and depress the trip lever 20 to open the gate of the hopper and permit the fruit therein to discharge in the baskets. The baskets will then be successively lowered into the tank 15 where they will be submerged into a checking solution. When lowered into the tank 15 the fruit in the baskets has a tendency to float and as the baskets pass around the sprockets 17 the fruit all gathers at one side of the baskets. For this reason, we provide a baffle plate 40 with which the baskets engage as they start to rise from the tank. This engagement will cause the baskets to slightly tip and thereby distribute the fruit evenly in the basket.

Upon leaving the tank 15 the baskets will be submerged into the rinsing tank 16 where the fruit will be thoroughly cleaned. After the baskets have left the tank 16 the sprockets 29 on the shafts of the baskets will engage with the chain 24. This will cause the baskets to be inverted to empty the fruit on the reciprocating screen 25. When emptied upon this screen the water will be thoroughly drained from the fruit and the latter will be evenly spread upon the trays carried by the endless conveyor operating below the screen.

The shaker screen is supported on pivotal links 40. One end of the screen connects with a pivoted bell crank lever 41. This lever in turn is connected with a reciprocable pitman rod 42 which is operated by an eccentric on the shaft 34. The endless conveyor 31 is operated from the driving mechanism of the machine by a driving belt 43 and bevel gear connections 44.

By our invention we are enabled to treat fruit in an economical manner, which fruit after treatment and dehydration will be of a superior quality. Also, as our machine insures that the fruit will be evenly dipped into the solution and the entire surface of the fruit will be exposed to the action of the solution, the use of hand work to sort out fruit not properly checked will be eliminated. Thus we effect a considerable saving in the cost of treating fruit prior to drying it.

It is obvious that the fruit is not handled at any period during the cycle of operation of the machine. This insures that the fruit treated by our machine will be in a sanitary condition.

While we have shown the preferred form of our invention, we wish it understood that various changes may be made in its construction without departing from the invention as defined in the appended claims.

Having thus described our invention, what we claim and desire to secure by Letters Patent is:—

1. In a fruit treating machine a tank adapted to contain a liquid for treating fruit, a feed hopper having a normally closed discharge opening, a continuously operating conveyer fitted with a plurality of fruit carriers, means operated by said carriers as they reach a point adjacent said feed hopper to open said normally closed discharge opening of said feed hopper, whereby fruit from said hopper will discharge into said carriers, said conveyer being arranged whereby said carriers will be successively submerged in the liquid in said tank for a predetermined period after receiving the fruit from said hopper.

2. In a fruit treating machine a tank adapted to contain a liquid for treating fruit, a feed hopper having a normally closed discharge opening, a continuously operating conveyer fitted with a plurality of fruit carriers, means operated by said carriers as they reach a point adjacent said feed hopper to open said normally closed discharge opening of said feed hopper, whereby fruit from said hopper will discharge into said carriers, said conveyer being arranged whereby said carriers will be successively submerged in the liquid in said tank for a predetermined period after receiving the fruit from said hopper, and means for automatically discharging the fruit from said carriers after the same have been removed from said tank.

3. In a fruit treating machine a tank adapted to contain a liquid for treating fruit, a feed hopper having a normally closed discharge opening, a continuously operating conveyer fitted with a plurality of fruit carriers, means operated by said carriers as they reach a point adjacent said feed hopper to open said normally closed discharge opening of said feed hopper, whereby fruit from said hopper will discharge into said carriers, said conveyer being arranged whereby said carriers will be successively submerged in the liquid in said tank for a predetermined period after receiving the fruit from said hopper, and means for successively revolving said carriers to discharge the fruit therefrom as the carriers are removed from the tank.

4. In a fruit treating machine a tank adapted to contain a liquid for treating fruit, a feed hopper having a normally closed discharge opening, a continuously operating conveyer fitted with a plurality of fruit carriers, means operated by said carriers as they reach a point adjacent said feed hopper to open said normally closed discharge opening of said feed hopper, whereby fruit from said hopper will discharge into said carriers, said conveyer being arranged whereby said carriers will be successively submerged in the liquid in said tank for a predetermined period after receiving the fruit from said hopper, means for successively revolving said carriers to discharge the fruit therefrom as the carriers are removed from the tank, and a reciprocating screen disposed in a position whereby fruit from the carriers will be discharged thereon, and a conveyer beneath said screen for conveying trays, the speed of said conveyer being such that fruit discharging onto said screen will be evenly spread over said trays.

5. In a fruit treating machine, a feed hopper having a swinging gate, a tank adapted to contain a liquid for treating fruit, an endless conveyor fitted with a plurality of fruit carriers, means whereby the gate of said hopper will be automatically opened as the carriers successively reach a point adjacent the feed hopper, said conveyor being arranged whereby said carriers will be successively submerged in the liquid in the tank after they have been supplied with fruit from the hopper, and means for successively revolving said carriers to discharge the fruit therefrom as the carriers are removed from the tank.

6. In a fruit treating machine, a feed hopper having a swinging gate, a tank adapted to contain a liquid for treating fruit, an endless conveyor fitted with a plurality of fruit carriers, means whereby the gate of said hopper will be automatically opened as the carriers successively reach a point adjacent the feed hopper, said conveyor being arranged whereby said carriers will be successively submerged in the liquid in the tank after they have been supplied with fruit from the hopper, means for successively revolving said carriers to discharge the fruit therefrom as the carriers are removed from the tank, and a reciprocating inclined screen disposed in a position whereby fruit from the carriers will be discharged thereon, and a conveyor beneath said screen for conveying trays, the speed of said conveyor being such that fruit discharging into said screen will be spread evenly over said trays.

7. In a fruit treating machine, a solution tank adapted to contain a liquid for treating fruit, a rinsing tank adapted to contain a liquid for cleaning fruit, a continuously operating endless conveyor fitted with a plurality of fruit carriers, a feed hopper, means for automatically discharging fruit from said hopper into said carriers at a point during their cycle of operation, said conveyor being arranged whereby said carriers will be successively submerged in the liquid in the solution tank and then in the liquid in the rinsing tank after said carriers have been supplied with fruit from said hopper.

8. In a fruit treating machine, a solution tank adapted to contain a liquid for treating fruit, a rinsing tank adapted to contain a liquid for cleaning fruit, a continuously operating endless conveyor fitted with a plurality of fruit carriers, a feed hopper, means for automatically discharging fruit from said hopper into said carriers at a point during their cycle of operation, said conveyor being arranged whereby said carriers will be successively submerged in the liquid in the solution tank and then in the liquid in the rinsing tank after said carriers have been supplied with fruit from said hopper, and means for automatically causing said carriers to discharge the fruit therein after said carriers have been removed from the rinsing tank.

9. In a fruit treating machine, a solution tank adapted to contain a liquid for treating fruit, a rinsing tank adapted to contain a liquid for cleaning fruit, a continuously operating endless conveyor fitted with a plurality of fruit carriers, a feed hopper, means for automatically discharging fruit from said hopper into said carriers at a point during their cycle of operation, said conveyor being arranged whereby said carriers will be successively submerged in the liquid in the solution tank and then in the liquid in the rinsing tank after said carriers have been supplied with fruit from said hopper, means for automatically causing said carriers to discharge the fruit therein after said carriers have been removed from the rinsing tank, an inclined reciprocable screen positioned to receive the fruit discharged from said carriers, an endless conveyor disposed below said screen for conveying trays, the speed of said conveyor being such that fruit discharged from said screen will be evenly spread over the trays carried by said conveyor.

10. In a fruit treating machine, a frame, an endless conveyor carried by the frame, a plurality of foraminous fruit carriers supported by said conveyor, a feed hopper having a swinging discharge gate, means for automatically opening the gate of said feed hopper as the carriers on the conveyor reach a predetermined position with relation to the hopper, a tank adapted to contain a solution for treating fruit, a second tank containing a liquid for cleaning fruit, said conveyor being arranged whereby the carriers thereon will be successively submerged in said tanks after they have been supplied with fruit from said hopper, automatically operating means for inverting said carriers after they have been removed from said second tank to discharge the fruit therefrom, a reciprocable inclined draining screen positioned to receive fruit discharged from said carriers, an endless conveyor disposed below said screen for conveying trays to receive fruit from the screen, the speed of said conveyor being such that fruit discharged from said screen will be evenly spread over said trays.

11. In a fruit treating machine, a feed hopper, a tank adapted to contain a liquid for treating fruit, a continuously operating fruit carrier, means whereby fruit from the hopper will be automatically discharged into said carrier at one point in its cycle of operation, means whereby said carrier will be submerged in the liquid in the tank for a predetermined period at another point in its cycle of operation, means for automatically discharging the fruit from said carrier after it has been removed from said tank, and means for maintaining the liquid in said tank at an even temperature.

RUSSELL W. ASHLEY.
JAY A. ASHLEY.